United States Patent

Avignon et al.

[11] Patent Number: 5,534,870
[45] Date of Patent: Jul. 9, 1996

[54] ANTICOLLISION DEVICE, NOTABLY FOR MOTOR VEHICLES

[75] Inventors: Bruno Avignon, Palaiseau; Charles Barre, Epinay-sur-Orge; Yves Canal, Antony, all of France

[73] Assignee: Thomson - CSF, Paris, France

[21] Appl. No.: 355,550

[22] Filed: Dec. 14, 1994

[30] Foreign Application Priority Data

Dec. 14, 1993 [FR] France .................. 93 14991

[51] Int. Cl.$^6$ .................................................. G08G 1/16
[52] U.S. Cl. .................................. 342/70; 342/107
[58] Field of Search .......................... 342/70, 71, 72, 342/107, 108, 113, 29, 32

[56] References Cited

U.S. PATENT DOCUMENTS

| | | | |
|---|---|---|---|
| 3,134,100 | 5/1964 | Lakatos | 342/29 |
| 3,798,644 | 3/1974 | Constant | 342/107 |
| 3,922,533 | 11/1975 | Royal | 364/516 |
| 4,027,307 | 5/1977 | Litchford | 342/32 |
| 4,110,754 | 8/1978 | Endō | 342/147 |
| 4,148,028 | 4/1979 | Fujiki | 342/70 |
| 4,160,250 | 7/1979 | Butler et al. | 342/105 |
| 4,855,748 | 8/1989 | Brandao et al. | 342/455 |
| 5,075,694 | 12/1991 | Donnangelo et al. | 342/455 |
| 5,249,157 | 9/1993 | Taylor | 340/903 |
| 5,315,303 | 5/1994 | Tsou et al. | 342/27 |

FOREIGN PATENT DOCUMENTS

0228070  7/1987  European Pat. Off. .......... 342/113

Primary Examiner—Michael J. Carone
Assistant Examiner—Christopher K. Montgomery
Attorney, Agent, or Firm—Oblon, Spivak, McClelland, Maier & Neustadt

[57] ABSTRACT

In an anticollision device, a moving object heading in a given direction along a movement vector and having a relative speed vector directed towards an obstacle is fitted out with at least two antennas sending out a microwave signal liable to be received by the obstacle. The device furthermore comprises reception means and means to analyze the echoes received from the obstacle, the analyzing means determining the variation with respect to time of the angle $\theta$ between the movement vector and the relative speed vector, a substantially zero variation of the angle $\theta$ indicating a risk of collision. Application to the equipment of motor vehicles to prevent collisions, notably in the event of poor visibility.

7 Claims, 8 Drawing Sheets

ANTICOLLISION DEVICE, NOTABLY FOR MOTOR VEHICLES

BACKGROUND OF THE INVENTION

1. Field of the Invention

The present invention relates to a anticollision device. It can be applied notably to the equipment of motor vehicles to enable them to avoid obstacles in front of them in the event of poor visibility for example. More generally, it can be applied to all functions relating to the prevention of collision between a moving object and an obstacle.

2. Description of the Prior Art

There are known anticollision systems for motor vehicles. A first known system uses a millimetrical radar whose antenna generally has a beam with an aperture equal to about 2 to 3 degrees. This width of the beam means that, at 100 meters from the vehicle, the width of the beam at −3 dB is about 5 meters and that, at 200 meters, its width is about 10 meters. With the latter width, an inoffensive lateral target, for example an indicator panel, may be illuminated by the beam and may therefore give rise to a false alarm. By contrast, at a small distance from the vehicle, the thinness of the beam means that an obstacle liable to collide with this vehicle may not be illuminated by the beam and may therefore be unobserved by the anticollision system. Finally, a heavy load in the rear of the vehicle or an uneven terrain may raise the end of the beam with respect to the obstacles in front of the vehicle and these obstacles then will not be illuminated.

To overcome these drawbacks, a scanning antenna could be used. However, such an approach is costly and therefore cannot be adapted to use on mass-produced vehicles.

There are known optical anticollision systems. They perform well in bright weather but are practically useless in poor weather, for example in rain or fog.

The aim of the invention is to overcome the above-mentioned drawbacks, notably by making it possible to obtain reliable and sure information relating to a risk of collision.

SUMMARY OF THE INVENTION

To this effect, an object of the invention is a device to prevent a collision between a moving object and an obstacle, the moving object heading in a given direction along a movement vector and having a relative speed vector directed towards the obstacle, wherein said device comprises at least two antenna fixedly joined to the moving object sending out a microwave signal, reception means and means to analyze the echoes received from the obstacle, the analyzing means determining the variation with respect to time of the angle between the movement vector and the relative speed vector, a substantially zero variation of the angle indicating a risk of collision.

The main advantages of the invention are that it works in all weather, can be adapted to all types of vehicles and is simple to implement and economical.

BRIEF DESCRIPTION OF THE DRAWINGS

Other features and advantages of the invention shall appear from the following description, made with reference to the appended drawings, of which.

MORE DETAILED DESCRIPTION

Figure 1A:
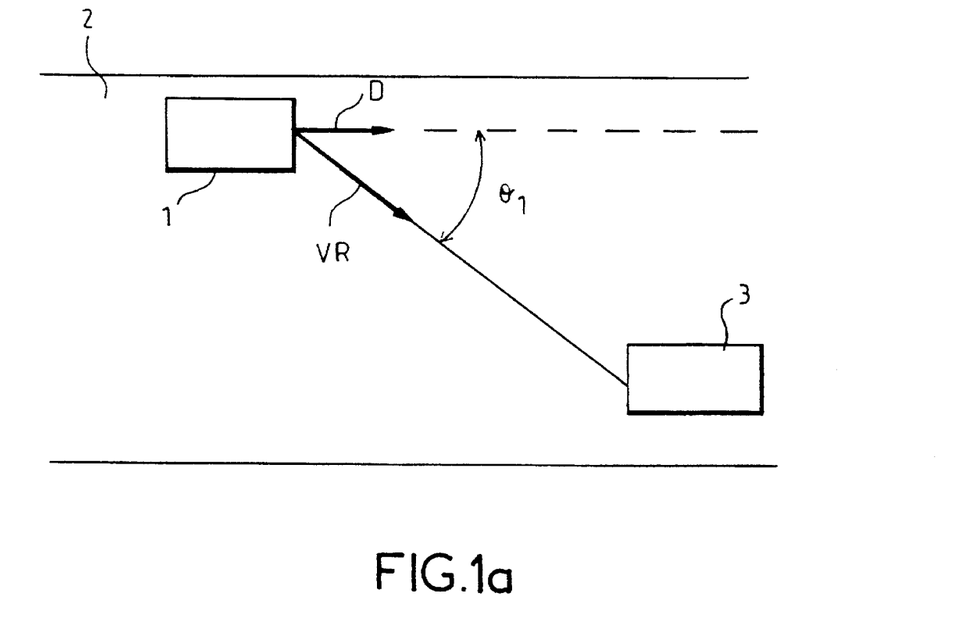
FIGS. 1a and 1b show a moving object approaching an obstacle at two different instants in a case where there is no risk of collision.

FIG. 1 shows a view, at a given instant $t_1$, of a moving object 1, a vehicle for example, moving on a track and approaching an obstacle 3, which is another vehicle for example, or any other type of possible obstacle. The moving object 1 has a vector D pointed in the direction of its movement and a speed vector $V_R$ directed towards the obstacle 3, the modulus of the speed vector expressing the relative speed between the obstacle and the moving object 1. The vector D indicates the given indication in which the moving object 1 is moving. At this given instant $t_1$ the relative speed vector $V_R$ and the movement vector form a first angle $\theta_1$ with each other.

Figure 1B:
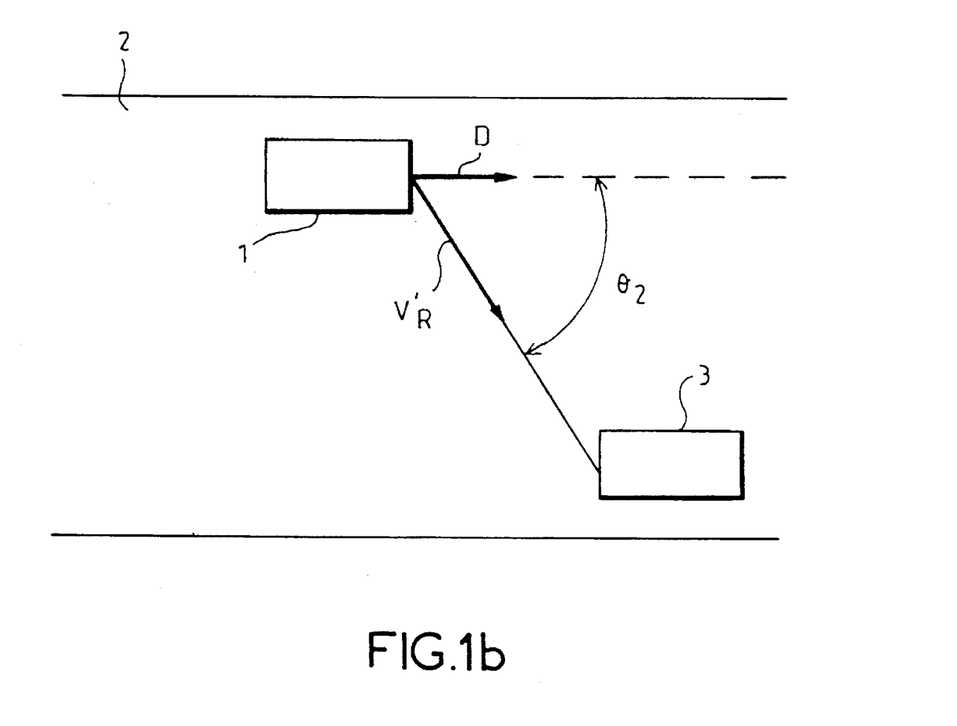

FIG. 1b shows the moving object 1 and the obstacle 3 at an instant $t_2$ subsequent to the previous instant $t_1$, the moving object 1 having further approached the obstacle 3. The moving object 1 and the obstacle 3 now have a relative speed vector $V_R'$ forming a second angle $\theta_2$ with the movement vector D of the moving obstacle 1. In the case of the approaching illustrated by FIGS. 1a and 1b, it is true that the moving object 1 approaches the obstacle 3 but it does not move towards it. There is therefore no risk of collision.

Figure 2A:
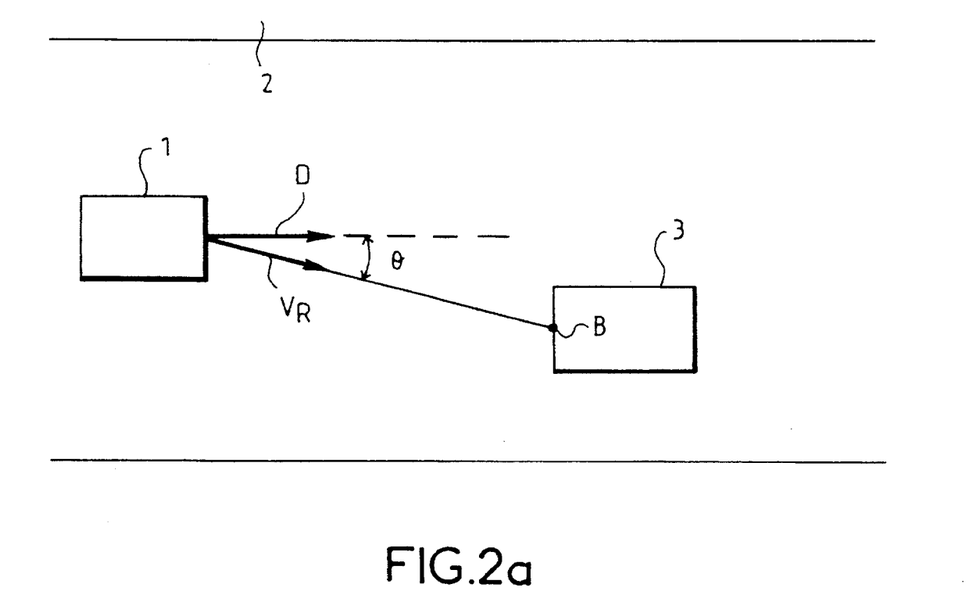
FIGS. 2a and 2b show the moving object approaching the obstacle at two different instants in a case where there is a risk of collision.
Figure 2B:
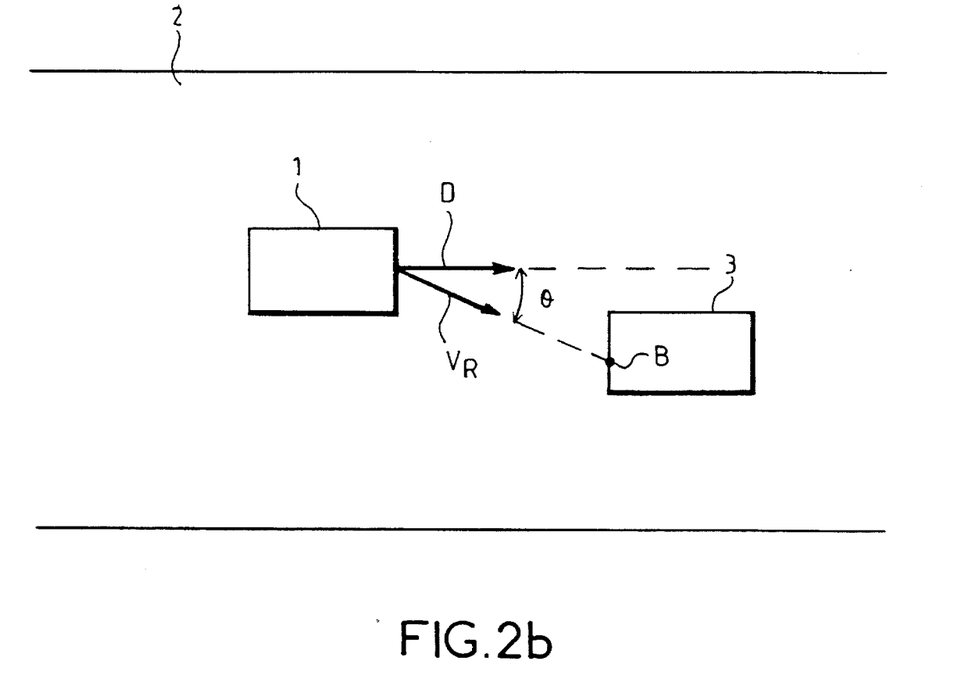

FIGS. 2a and 2b illustrate a case of a risk of collision between the moving object 1 and the obstacle 3.

FIG. 2a shows the relative positions of the moving object 1 and the obstacle 3 at a first given instant $t_1$.

FIG. 2b shows their relative positions at a second instant $t_2$ after the previous instant, the moving object having approached the obstacle 3.

The principle of operation of the device according to the invention notably makes use of the fact that when the moving object 1 is moving towards the obstacle 3 to the point where there is a risk that it will collide with this obstacle 3, the relative speed vector $V_R$ aimed at a given point B of the obstacle 3, the angle θ between the movement vector D and the relative speed vector $V_R$ remains substantially constant during the approach between the moving object and the obstacle, the amplitude of the relative vector $V_R$ possibly varying. This constant angle θ is illustrated by FIGS. 2a and 2b taken at two instants $t_1$, $t_2$ during this approach. In the case of FIGS. 1a and 1b, where there is an approach without any risk of collision, the angle $\theta_2$ of the instant $t_2$ is different from the angle $\theta_1$ of the previous instant $t_1$.

Figure 3:
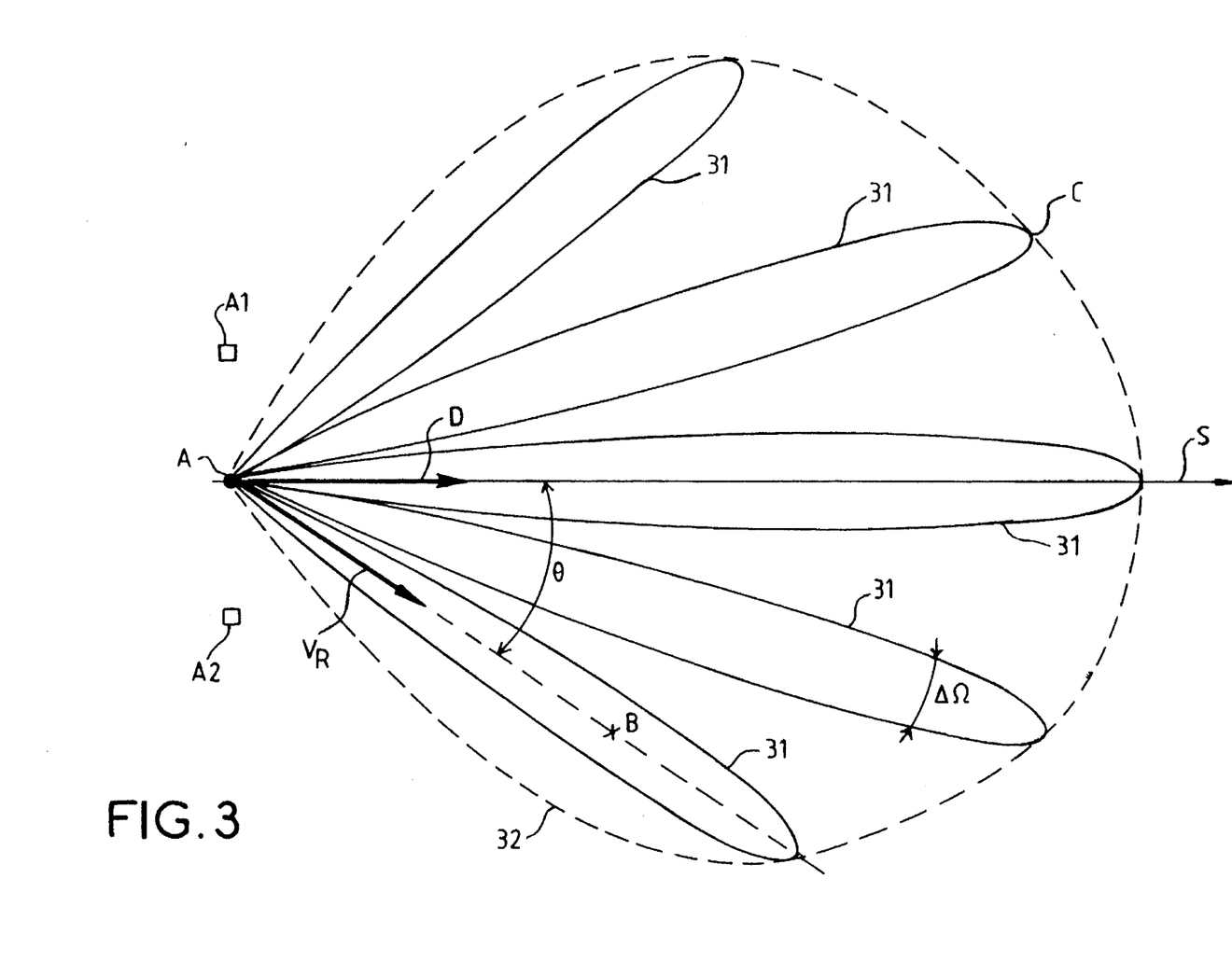
FIG. 3 shows a pattern of interference arising out of the transmission of at least two antennas fixedly joined to the moving object.

The device according to the invention uses at least two antennas $A_1$, $A_2$ represented by their relative positions in FIG. 3, these positions being possibly represented by points owing to the great distance between the antennas and the obstacle. Furthermore, these points may represent, for example, the origin of the beams of the antennas $A_1$, $A_2$. These two antennas $A_1$, $A_2$ each send out a microwave signal, the obstacle 3 being capable of sending back an echo. In the case of application to a motor vehicles, these antennas are for example each placed in a front headlight. Should these two antennas $A_1$, $A_2$ transmit simultaneously for example, they produce interference lobes 31. The distance between the antennas and a point C of the end of a lobe belonging to the envelope 32 of the pattern of an antenna is given by the following relationship:

$$\overline{A1C} = \overline{A2C} + k\lambda \qquad (1)$$

where $\overline{A1C}$ and $\overline{A2C}$ respectively represent the distance between the point C and the first antenna $A_1$, and the distance between the point C and the second antenna $A_2$, where $\lambda$ represents the wavelength sent out by the antennas $A_1$, $A_2$ and k represents a positive integer.

Each interference lobe 31 furthermore has a width $\Delta\Omega$ at $-3$ dB, approximately defined by the following relationship:

$$\Delta\Omega = \frac{65° \lambda}{\overline{A1A2}} \qquad (2)$$

where $\lambda$ again represents the wavelength sent out by the antennas $A_1$, $A_2$ and $\overline{A1A2}$ represents the distance between these antennas, this distance being for example equal to the width of the moving object 1.

Assuming that the obstacle whose position is identified by a point B is located in an interference lobe 31 as illustrated in FIG. 3, this point B sends back an energy E to reception means associated with the antennas $A_1$, $A_2$. The point B has a relative speed with respect to a point A of the moving object, the relative speed being represented by a vector $V_R$ having its origin at A and being directed towards the point B, the point A being for example located in the middle between the two antennas $A_1$, $A_2$. This point A has a movement vector D which is that of the moving object 1.

The relative speed vector $V_R$ forms an angle $\theta$ with the movement vector D.

So long as the point B of the obstacle remains on a straight line going, for example, through the midpoint of the two antennas $A_1$, $A_2$, this straight line forming a constant angle with the movement vector D, there may be a risk of collision.

Figure 4:
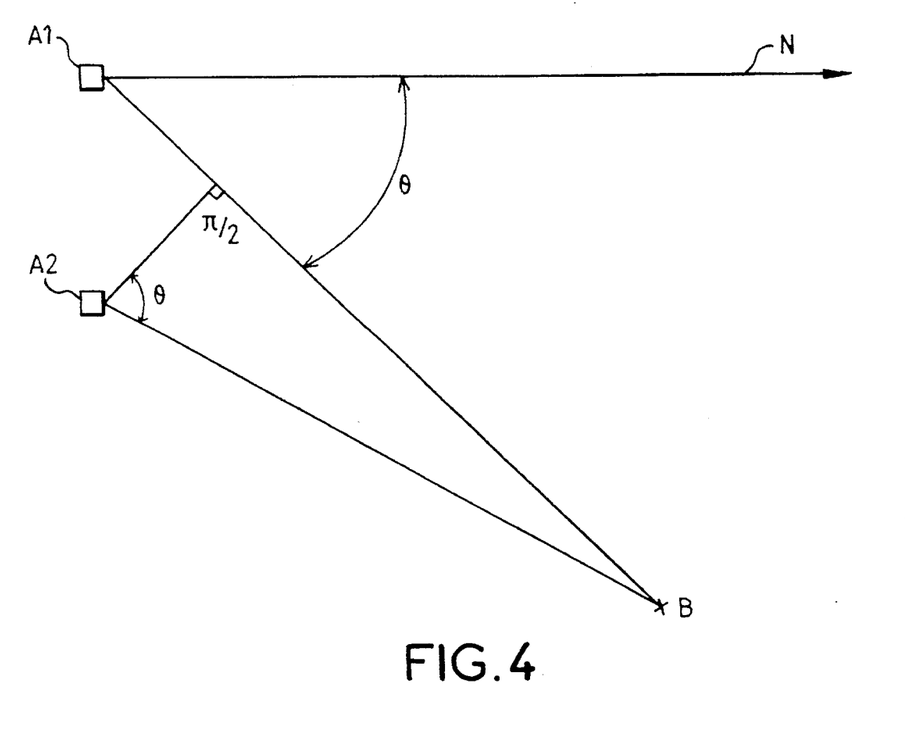
FIG. 4 illustrates the angles that are formed by the obstacle with the above-mentioned antennas.

FIG. 4 illustrates the angles formed by the above-mentioned point B with the antennas $A_1$, $A_2$. The vector, having its origin at the reference point of the first antenna $A_1$ and having its end at B, forms an angle with an axis N going through the reference point of the first antenna $A_1$ and parallel to the above-mentioned axis of symmetry S, this angle being substantially equal to the above-defined angle $\theta$ between the relative speed vector $V_R$ and the movement vector D, because the distance between the two antennas $A_1$, $A_2$ and hence the distance between the midpoint A of these antennas and the first antenna $A_1$ is very small as compared with the distance between the antennas and the point B of the obstacle.

The energy E received from the obstacle by the reception means associated with the two antennas can be formulated by the following relationship, if the antennas $A_1$, $A_2$ transmit in phase:

$$E = E1 \cos \frac{2\pi \overline{A1B}}{\lambda} + E2 \cos \frac{2\pi \overline{A2B}}{\lambda} \qquad (3)$$

$\overline{A1B}$ and $\overline{A2B}$ respectively represent the distance between the point B and the first antenna $A_1$ and the distance between the point B and the second antenna $A_2$, $E_1$ and $E_2$ being respectively the energy sent back by the obstacle as a function of the energy sent by the first antenna $A_1$ and by the second antenna $A_2$.

If $E_1 = E_2 = E_0$, where the two antennas send, for example, the same energy, the previous energy E can be formulated by the following relationship:

$$E = Eo \left( \cos \frac{2\pi \overline{A1B}}{\lambda} + \cos \frac{2\pi \overline{A2B}}{\lambda} \right) \qquad (4)$$

The value $\overline{A1B} - \overline{A2B}$ constitutes the difference in step. It is equal to $\overline{A1A2}$ sine $\theta$, $\theta$ being the above defined angle.

The energy E of the echo received can then be written as follows:

$$E = 2 Eo \cos \left[ \frac{2\pi}{\lambda} (\overline{A1B} + \overline{A2B}) \right] \cos \left[ \frac{2\pi}{\lambda} \overline{A1A2} \text{ sine } \theta \right] \qquad (5)$$

If there is no risk of collision, the angle $\theta$ fluctuates and hence the energy received fluctuates too.

In the event of a risk of collision, the angle $\theta$ remains constant and therefore, under the effects of the approaching in distance contained in the first cosine term of the relationship (5), the energy E of the echo received does not fluctuate. The analysis of the this energy E received, in enabling the analysis of the variations of the angle $\theta$, could make it possible to foresee the risks of collision. However, two drawbacks appear. The first one arises out of the fact that if the obstacle is located between the interference lobes 31, it is not identified by the detection means associated with the antennas: it may be the case therefore that it is impossible to avoid it.

According to the invention, to overcome this drawback, the two antennas $A_1$, $A_2$ transmit for example sequentially so that, at each instant, the entire zone contained in the envelope 32 of the pattern of an antenna is illuminated. There are therefore no longer any interference lobes 31 and therefore no longer any interference gaps. This result being achieved, the device according to the invention comprises means to preserve the instantaneous phase of the echoes received from the obstacle B following each antenna transmission, these means being for example distance extractors preserving the instantaneous phase of a received wave, which is achieved notably by all Doppler effect radars. It is then possible to reconstitute an echo received from the obstacle B, whose phase remains associated with the previously defined distances $\overline{A1B}$ and $\overline{A2B}$ thus making it possible to obtain a signal as a function of the angle $\theta$. The means used to preserve the phase are, for example, constituted by means for the correlation of the received echo with a clock signal having a constant phase in a radar with frequency modulation or phase hopping. One of these means is, for example, formed by a temporal gate of a pulse radar keeping the instantaneous phase at each recurrence of transmission, this phase bearing the Doppler effect.

If the frequency of sequential use of the two antennas $A_1$, $A_2$ is at least equal to twice the highest Doppler frequency expected, then the Doppler signal may be reconstituted from the samples for each transmission of the antenna $A_1$, $A_2$ by the application of the Shannon theorem.

Figure 5A:
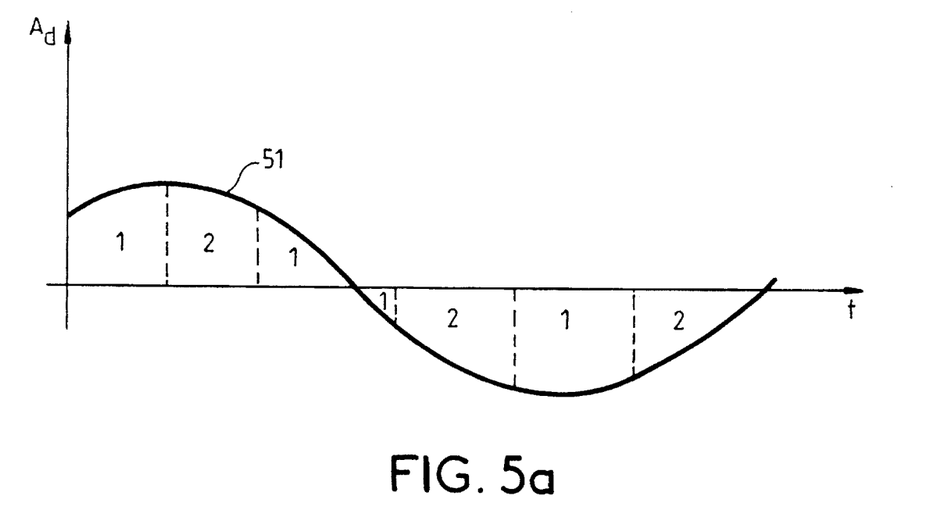
FIGS. 5a and 5b are reconstituted signals obtained from each of the antennas, the antennas working sequentially.
Figure 5B:
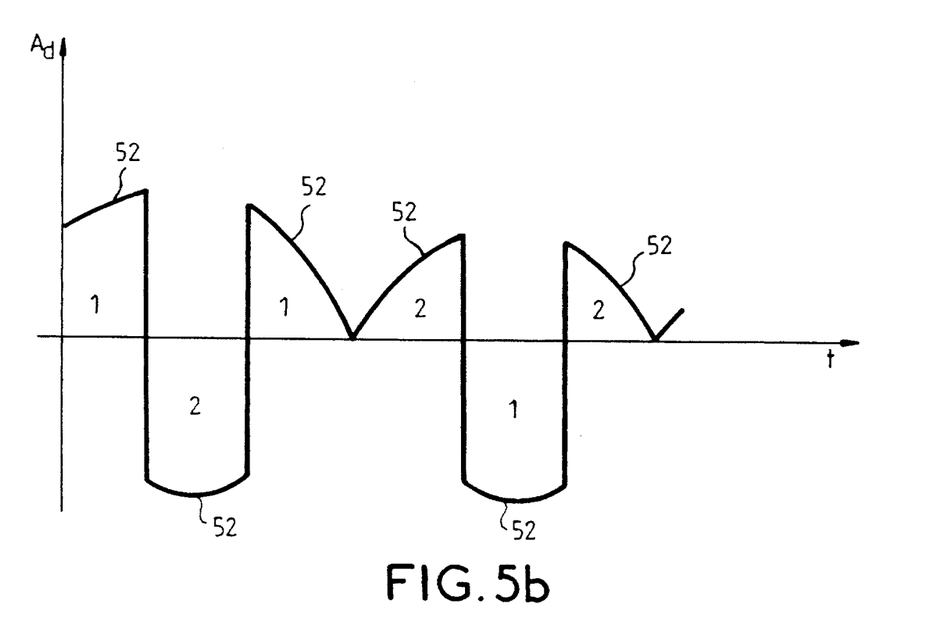

FIGS. 5a and 5b give a view, as a function of time, of the amplitude Ad of the signals reconstituted from the samples received for each antenna transmission in the case where the obstacle B belongs respectively to the position of a former interference lobe 31 or a former interference gap.

In FIG. 5a, the signal 51 is reconstituted from samples, in phase, produced successively from the transmission of either of the antennas $A_1$, $A_2$, the signal samples coming from the first antenna $A_1$ being identified by portions carrying the number 1 and the signal samples coming from the second antenna $A_2$ being identified by portions carrying the number 2.

In the case of FIG. 5b, since the obstacle B is at the position of an interference gap, the samples from the two antennas are in phase opposition. The signal 52 reconstituted from the samples received then has a same surface on each side of the temporal axis t. This signal, filtered by a lowpass filter at the switch-over frequency of the two antennas $A_1$, $A_2$ therefore has a result equal to zero. To obtain a non-zero result, according to the invention, instead of adding the reception channels associated with each antenna, these channels are, for example, deducted one by one to obtain a non-zero signal after lowpass filtering.

Figure 6:
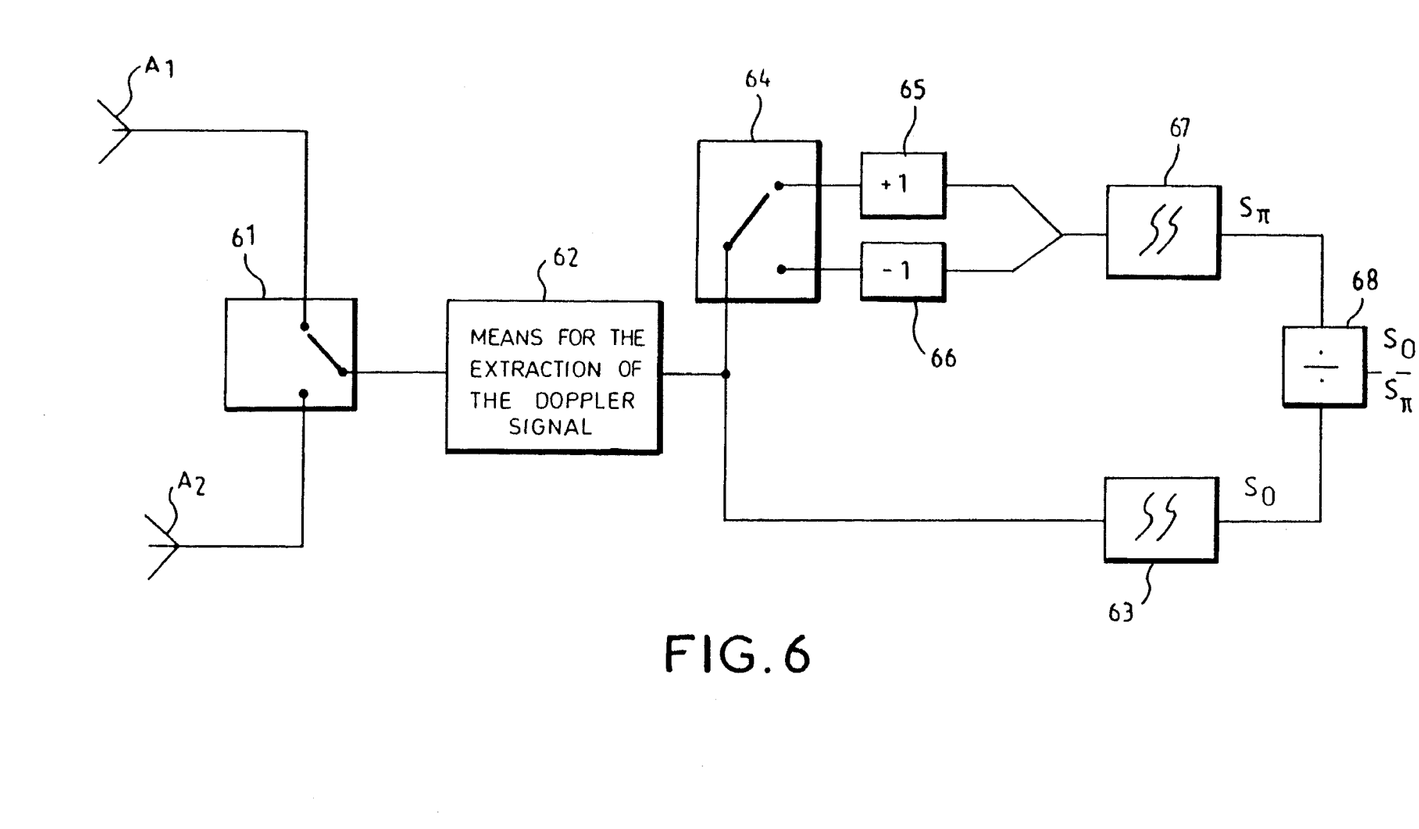
FIG. 6 shows a possible embodiment of a device according to the invention.

FIG. 6 shows a possible embodiment of the device according to the invention making it possible to obtain two signals So, S$\pi$ after lowpass filtering. The first signal So is obtained by filtering of the signal 51 reconstituted from the Doppler samples in phase and the signal S$\pi$ is obtained by filtering of the signal 52 obtained from the Doppler samples that are in phase opposition but are reset in phase beforehand by a reversal of the sign, namely by a $\pi$ phase shift, of the signals coming from one of the antennas, this being done so as to obtain a non-zero filtered signal.

The two antennas $A_1$, $A_2$ are connected to first switching means 61, these switching means carrying out the sequential switching of the samples of echoes received from the obstacle B the first antenna $A_1$ and by the second antenna $A_2$. The output of the first switching means 61 is connected to means 62 for the extraction of the Doppler signals which characterize the instantaneous phase of the samples of echoes received successively by either antenna. The output of the means for the extraction of the Doppler signals is connected firstly to a first lowpass filter 63 whose output delivers the signal So and secondly to second switching means 64 whose switching is synchronous with the first switching means 61. The second switching means 64 have a first output connected to a first channel 65 which does not reverse its input signal and a second output connected to a second channel 66 which reverses its input signal, the two channels 65, 66 being connected together at their outputs to the input of a second lowpass filter 67 whose output delivers the signal S$\pi$. The initial positions of the switching means 61, 64 are, for example, adjusted so that the signals obtained at the inputs of the filters 63, 67 do not produce zero signals at the output of these filters but, on the contrary, non-zero signals So, S$\pi$. According to the invention, the ratio So/S$\pi$ of these signals is analyzed because it gives an efficient indication of the variation of the previously defined angle $\theta$ along with, furthermore, the value of this angle. For this purpose, the output of the filters 63, 67 are, for example, connected to means for dividing the energy of the signal So by the energy of the signal S$\pi$.

By application of the relationship (4) established previously:

$$So = Eo \left( \cos 2\pi \frac{\overline{A1B}}{\lambda} + \cos 2\pi \frac{\overline{A2B}}{\lambda} \right) \quad (6)$$

and $$S\pi = Eo \left( \cos 2\pi \frac{\overline{A1B}}{\lambda} - \cos 2\pi \frac{\overline{A2B}}{\lambda} \right) \quad (7)$$

The signal coming from the second antenna $A_2$ being, for example, the one that is reversed by the second channel 66, hence phase-shifted by $\pi$, whence the second term $$-\cos 2\pi \frac{\overline{A2B}}{\lambda}$$

in the expression of S$\pi$ instead of cos $$2\pi \frac{\overline{A2B}}{\lambda}$$

in the expression of So.

From the relationships (6) and (7), it follows that:

$$\frac{So}{S\pi} = \frac{\cos 2\pi \frac{\overline{A1B}}{\lambda} + \cos 2\pi \frac{\overline{A2B}}{\lambda}}{\cos 2\pi \frac{\overline{A1B}}{\lambda} - \cos 2\pi \frac{\overline{A2B}}{\lambda}} \quad (8)$$

From the relationship (8) and since:

$$\overline{A1B} = \overline{A2B} + \overline{A1A2} \text{ sine } \theta, \text{ we get} \quad (9)$$

$$\frac{So}{S\pi} =$$

$$\cotan\left( \frac{2\pi \overline{A2B}}{\lambda} + \frac{\pi \overline{A1A2} \text{ sine } \theta}{\lambda} \right) \cotan\left( \frac{\pi \overline{A1A2} \text{ sine } \theta}{\lambda} \right)$$

giving $$\frac{So}{S\pi} = \frac{1 - \tan\left( 2\pi \frac{\overline{A2B}}{\lambda} \right) \tan\left( \pi \frac{\overline{A1A2}}{\lambda} \text{ sine } \theta \right)}{\tan\left( 2\pi \frac{\overline{A2B}}{\lambda} \right) + \tan\left( \pi \frac{\overline{A1A2}}{\lambda} \text{ sine } \theta \right)} \times$$

$$\frac{1}{\tan\left( \pi \frac{\overline{A1A2} \text{ sine } \theta}{\lambda} \right)}$$

i.e. $\frac{So}{S\pi}$ may be expressed by a function F of $$\tan\left( \pi \frac{\overline{A1A2}}{\lambda} \text{ sine } \theta \right) :$$

$$\frac{So}{S\pi} = F\left[ \tan\left( \pi \frac{\overline{A1A2}}{\lambda} \text{ sine } \theta \right) \right]$$

the signal $$\frac{So}{S\pi}$$

therefore makes it possible to analyze the variation of the angle $\theta$. It may furthermore give a measurement of this angle. This variation of the angle $\theta$ is periodic in the interference pattern, i.e. $\theta$ is known to within k $\Delta\Omega$, k being an integer and $\Delta\Omega$ being the width at $-3$ dB of the interference lobes defined by the foregoing relationship (2). A risk of collision takes place when $$\frac{d\theta}{dt} = o,$$

substantially.

Given that:

$$\frac{d(So/S\pi)}{dt} = \frac{d(So/S\pi)}{d\theta} \times \frac{d\theta}{dt},$$

in analyzing the ratio $S\theta/S\pi$, a risk of collision occurs when:

$$\frac{d(So/S\pi)}{dt} = 0.$$

In practice, the absolute value of $$\frac{d(So/S\pi)}{dt}$$

is for example compared with a threshold So. If, then it is assumed that there is a risk of collision.

Figure 7:
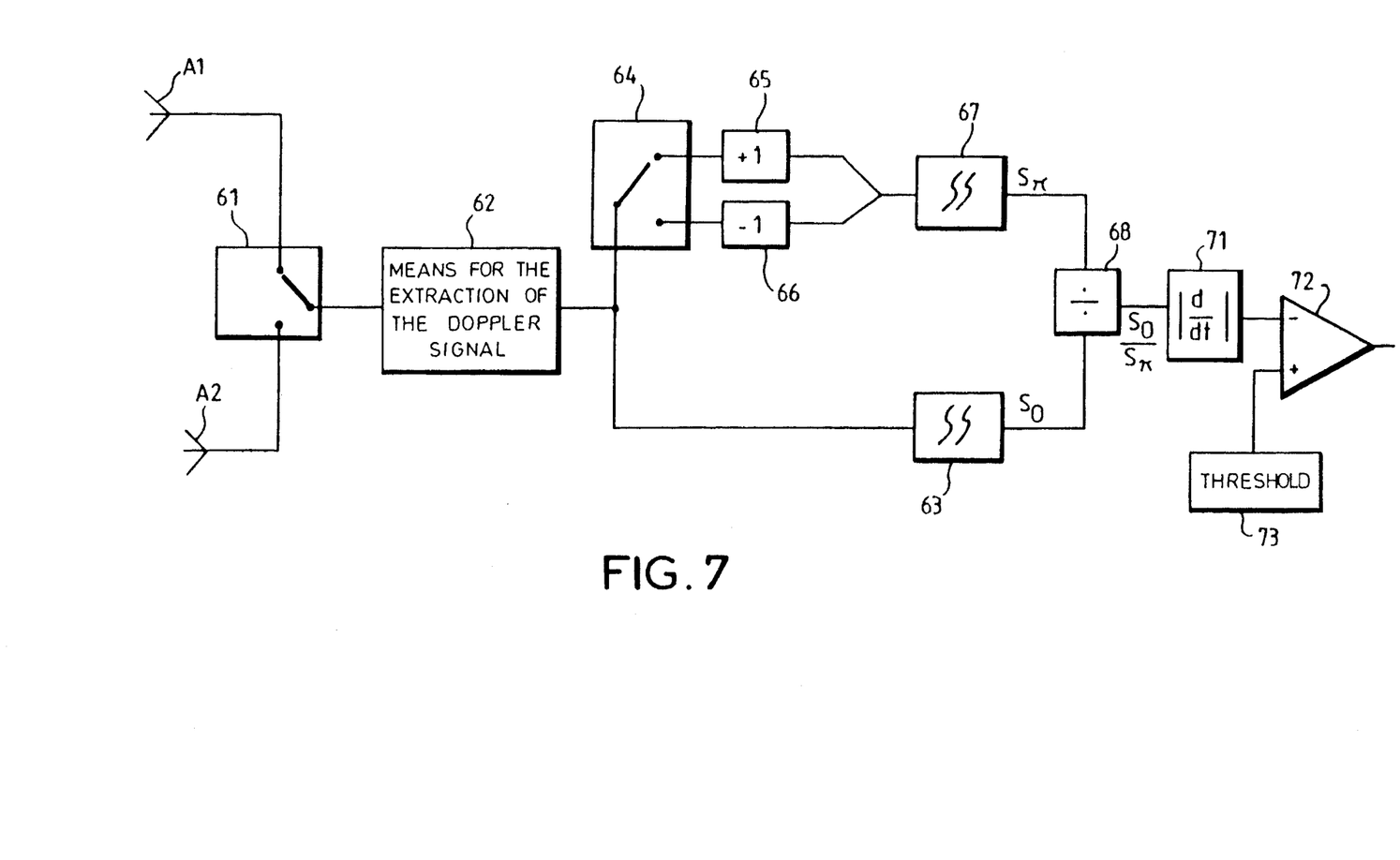
FIG. 7 shows another possible embodiment complementing the previous one to achieve a definition, by comparison with a threshold, of a risk of collision.

FIG. 7 illustrates an example of the implementation of the method for determining the risk of collision in complementing the embodiment of FIG. 6.

The output of the division means 68 giving the ratio $So/S\pi$ is connected to the input of the means 71 of derivation in relation to time which furthermore give the absolute value of $$\frac{d(So/S\pi)}{dt}.$$

This value is, for example, displayed at the negative input of comparison means 72 whose positive input is connected to a threshold 73. The information obtained at output of the comparison means 72 indicate the existence or non-existence of a risk of collision, a positive signal indicating, for example, a risk of collision and a negative or zero signal indicating the absence of a risk of collision.

According to the invention, the value of the derived signal $$\frac{d(So/S\pi)}{dt}$$

is an indicator, for each distance between the moving object 1 and the obstacle 3, of their lateral distance.

Figures 8, 9:
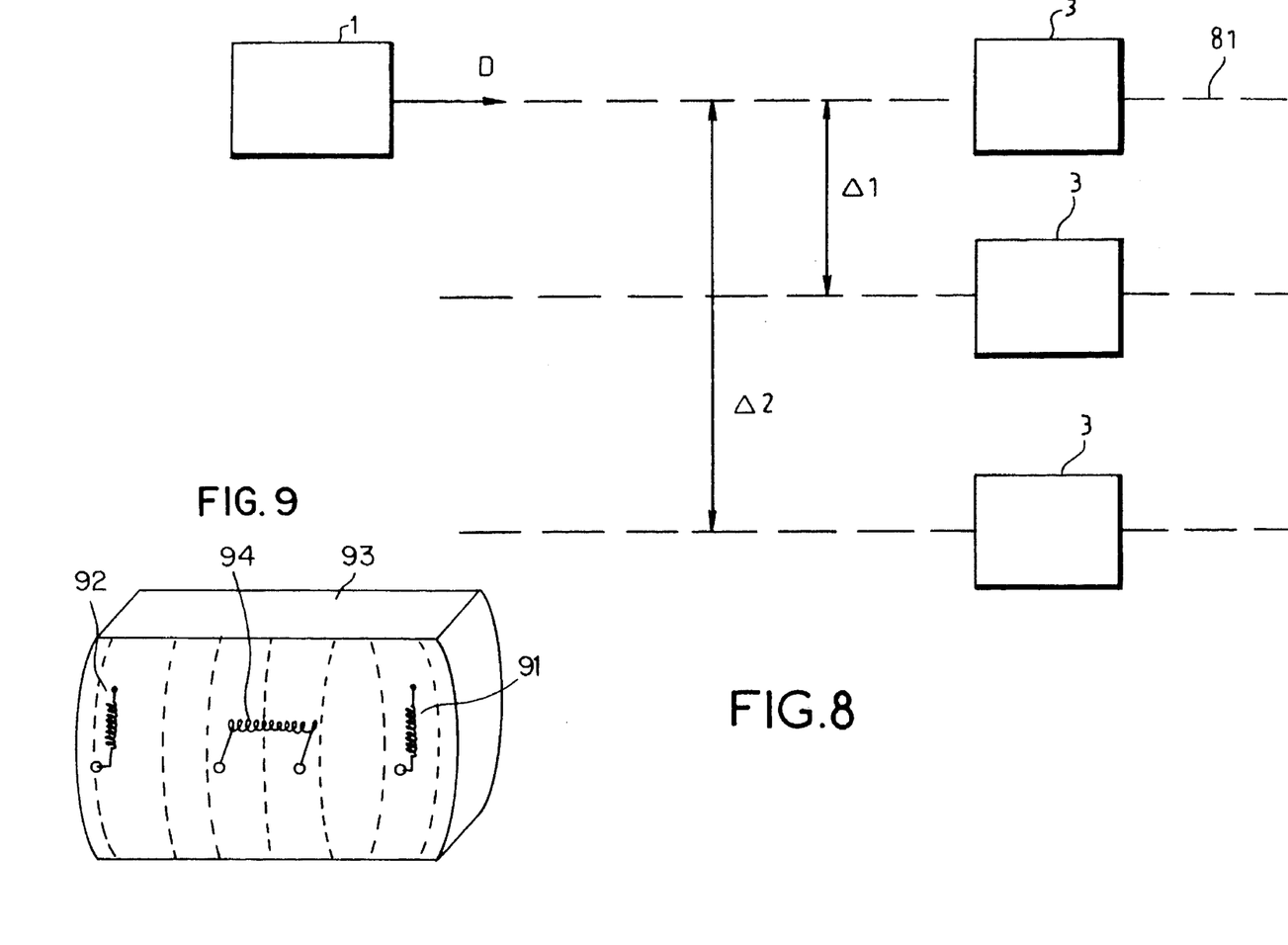
FIG. 8 illustrates the lateral divergence between the moving object and the obstacle.
FIG. 9 illustrates a pair of antennas mounted in a headlight of an automobile.

FIG. 8 illustrates different lateral distances.

If the moving object is moving towards the obstacle 3, i.e. if this obstacle is on a straight line 81 including the movement vector D of the moving object 1, then $$\frac{d(So/S\pi)}{dt}$$

is theoretically zero.

If the moving object 1 is not moving towards the obstacle 3 but is maintaining a first lateral divergence $\Delta 1$ with respect to this obstacle 3, then $$\frac{d(So/S\pi)}{dt}$$

is non-zero and if the moving object keeps a second lateral divergence $\Delta 2$ with respect to the obstacle that is greater than the first divergence $\Delta 1$, then $$\frac{d(So/S\pi)}{dt}$$

is again non-zero but is furthermore greater than the derived signal $$\frac{d(So/S\pi)}{dt}$$

corresponding to the first lateral divergence $\Delta 1$.

The threshold 73 defined here above to define the risk of collision may therefore be dependent on the distance for tolerating a constant lateral divergence between the moving object 1 and the obstacle 3, the value $$\frac{d(So/S\pi)}{dt}$$

being representative, as a function of the distance between this moving object and this obstacle, of their lateral divergence. The definition of a lateral divergence below which a risk of collision is taken into consideration makes it possible notably to improve the safety of the moving object 1. This makes it possible notably to get rid of the effects of a conical beam that is too narrow at short distances and too wide at great distances. The value of the tolerated divergence may, for example, vary as a function of different parameters related to traffic conditions, conditions of relief, environmental conditions or atmospheric conditions notably.

FIG. 9 illustrates a pair of antennas 91, 92 encased inside of a motor vehicle headlight 93. The antennas are illustrated as mounted on opposite sides of a headlight filament 94.

Finally, apart from the measurement of the above-mentioned angle $\theta$, the device according to the invention may measure the speed of the obstacle as well as its distance from the moving object to provide for a more precise assessment of the risk of collision.

The anticollision device according to the invention can be applied, for example, to motor vehicles. It can be applied to all types of moving objects, aircraft for example. The obstacles to be avoided may be of all kinds.

What is claimed is:

1. A device to prevent a collision between a moving object and an obstacle, the moving object heading in a given direction along a movement vector and having a relative speed vector directed towards the obstacle, comprising:

first and second antennas fixedly joined to the moving object for transmitting, sequentially and in alternation, plural microwave signals liable to be received by the obstacle, and comprising means for preserving an instantaneous phase of plural echoes received during the plural antenna transmissions so as to obtain a Doppler signal constituted by said plural echoes, the Doppler signal indicating an angle, $\theta$, between the movement vector and the relative speed vector;

reception means for receiving from said first and second antennas plural echo signals indicative of said plural echoes received from the obstacle;

means for analyzing said plural echo signals, comprising determining means for determining a variation with respect to time of the angle, $\theta$, a substantially zero variation of the angle $\theta$ indicating a risk of collision;

first switching means having first and second switching inputs for receiving said plural signals connected to corresponding first and second antennas and having a first switching output for switching said plural signals;

means for obtaining the Doppler signal, connected to the output of said first switching means and having a Doppler output;

a first lowpass filter having a first lowpass output, So, and having a first lowpass input connected to the Doppler output;

a second lowpass filter having a second lowpass output, $S\pi$, and having a second lowpass input;

a second switching means having a third switching input connected to the Doppler output and synchronous with said first switching means for switching the Doppler signal to an inverter channel or to a non-inverter channel, the non-inverter channel being switched over when said first antenna is switched over and the inverter channel being switched over when said second antenna is switched over, said inverter and non-inverter channels being connected to said second lowpass input; and means for dividing having first and second inputs connected to said first and second lowpass outputs and having a ratio output, (So/Sπ), of said first and second lowpass outputs indicating the angle, θ.

2. A device according to claim 1, wherein a threshold is set as a function of a distance between the moving object and the obstacle to define a lateral divergence within which a presence of the obstacle indicates a risk of collision.

3. A device according to claim 1, wherein the moving object is a motor vehicle.

4. The device of claim 3, wherein said first and second antennas are placed in a front headlight of the motor vehicle.

5. The device according to claim 1, further comprising:

a derivative means, comprising means for computing a derivative with respect to time:

$$\frac{d(So/S\pi)}{dt},$$

of the ratio output, (So/Sπ); and means for indicating a risk of collision when an absolute value of said derivative falls below a threshold.

6. The device according to claim 1, further comprising:

comparison means having first and second comparison inputs and having a comparison output indicating a risk of collision, wherein said first comparison input is connected to a threshold value; and derivation means having a derivation input connected to said ratio output, and having a derivation output connected to said second comparison input, said derivation means giving an absolute value of a derivative, with respect to time, of the ratio output, (So/Sπ).

7. The device according to any one of claims 2–4, 1, 5–6, wherein said device measures a speed of the obstacle and a distance between itself and the moving object, the speed and distance being combined with the angle, θ, to indicate a risk of collision.

* * * * *